US007149410B2

United States Patent
Lin et al.

(10) Patent No.: US 7,149,410 B2
(45) Date of Patent: *Dec. 12, 2006

(54) TRICK MODES USING NON-PROGRESSIVE DUMMY BIDIRECTIONAL PREDICTIVE PICTURES

(75) Inventors: Shu Lin, Indianapolis, IN (US); Donald Henry Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 801 days.

This patent is subject to a terminal disclaimer.

(21) Appl. No.: 10/164,874

(22) Filed: Jun. 7, 2002

(65) Prior Publication Data

US 2003/0076884 A1   Apr. 24, 2003

Related U.S. Application Data

(60) Provisional application No. 60/334,914, filed on Oct. 23, 2001.

(51) Int. Cl.
*H04N 5/91* (2006.01)
*H04N 7/26* (2006.01)

(52) U.S. Cl. .......................................... 386/68; 386/111
(58) Field of Classification Search .............. 386/68, 386/69, 70, 109, 111, 112, 45, 40, 124, 125, 386/6, 27, 33
See application file for complete search history.

(56) References Cited

U.S. PATENT DOCUMENTS 5,684,539 A    11/1997   Boyce et al. ................ 348/420
5,805,762 A    9/1998    Boyce et al. ................. 368/68
5,978,542 A    11/1999   Ting et al.
5,978,855 A    11/1999   Metz et al. .................. 709/249
6,058,241 A    5/2000    Kawamura et al.
6,118,491 A    9/2000    Wu et al.
6,192,186 B1   2/2001    Murashima et al. .......... 368/68
6,201,927 B1   3/2001    Comer
6,865,747 B1*  3/2005    Mercier ....................... 725/94
2002/0191959 A1 12/2002  Lin et al. ..................... 386/68

FOREIGN PATENT DOCUMENTS

| WO | WO 96/13121 | 5/1996 |
| WO | WO 99/65239 | 12/1999 |
| WO | WO 00/59218 | 10/2000 |

* cited by examiner

*Primary Examiner*—Robert Chevalier
(74) *Attorney, Agent, or Firm*—Joseph J. Laks; Robert B. Levy; Jorge Tony Villabon

(57) ABSTRACT

The invention concerns a method (200, 300) and system (100) for performing a trick mode on a video signal containing a plurality of original pictures. The method includes the steps of receiving a trick mode command (212, 312) and selectively inserting (214, 324) at least one dummy bidirectional predictive picture in the video signal using field-based prediction to form a trick mode video signal. In one arrangement, each dummy bidirectional predictive picture can be a one-directional predicted picture, and the method can further include the step of predicting each dummy bidirectional predictive picture from a reference picture. In another arrangement, the predicting step can further include predicting each dummy bidirectional predictive picture from a single field associated with the reference picture.

28 Claims, 5 Drawing Sheets

TRICK MODES USING NON-PROGRESSIVE DUMMY BIDIRECTIONAL PREDICTIVE PICTURES

CROSS REFERENCE TO RELATED APPLICATIONS

This is a non-provisional application of provisional application Ser. No. 60/334,914 filed Oct. 23, 2001.

BACKGROUND OF THE INVENTION

1. Technical Field

The inventive arrangements relate generally to video systems and more particularly to video systems that record or play back digitally encoded video sequences.

2. Description of Related Art

Digital televisions (DTV) and high-definition televisions (HDTV) are gaining popularity in today's consumer electronics marketplace. Many purchasers of these types of televisions also buy digital video recorders or players, such as digital video disc (DVD) recorders or players, for purposes of viewing previously recorded programs or recording their favorite programs. Notably, the combination of a DTV (or an HDTV) and a digital video recorder or player can be an integral part of a home theater entertainment system.

A digital video recorder or player typically contains a Moving Pictures Expert Group (MPEG) decoder to decode the digitally encoded multimedia data that is stored on the medium (e.g. disc) that the recorder or player plays. If the digital video recorder or player is connected to a conventional (non-DTV or non-HDTV) television, the digitally encoded signal will be decoded by the digital video recorder or player's MPEG decoder before being displayed on the conventional television. Significantly, however, many DTV's contain their own MPEG decoders. As such, if a digital video recorder or player is connected to a DTV, the video signal read from the disc is remotely decoded by the DTV's decoder. This configuration can be referred to as a remote decoder arrangement.

There is, however, an important disadvantage to decoding digitally encoded signals with a remote DTV decoder. Namely, it is very difficult to perform trick modes in this type of arrangement. A trick mode can be any playback of video during which the playback is not done at normal speed or in a forward direction. Oftentimes, a trick mode involves repeating a number of pictures in a video signal such as during a slow motion or freeze trick mode. As the bandwidth between the digital video recorder or player and the DTV is limited, repeating pictures in the signal being fed to the DTV may cause the signal to exceed the maximum bit rate limit of the transmission channel. The problem is even more acute if the pictures are intra (I) pictures or predictive (P) pictures, as these pictures may be encoded with a relatively large number of bits.

In addition to the bit rate problem, there is another disadvantage to decoding video signals remotely: the repeated display of non-progressive pictures in such an arrangement can cause a vibration effect to appear in the display if the repeated pictures contain a moving object. To explain this drawback, a brief explanation of interlaced scanning is warranted.

Many televisions employ the interlaced scanning technique. Under this format, the video signal is typically divided into a predetermined number of horizontal lines. During each field period, only one-half of these lines are scanned; generally, the odd-numbered lines are scanned during the first field period, and the even-numbered lines are scanned during the next field period. Each sweep is referred to as a field, and when combined, the two fields form a complete picture or frame. For an NTSC system, sixty fields are displayed per second, resulting in a rate of thirty frames per second.

As a moving object moves across the screen in an interlaced scanning television, each field will only display a portion of the moving object. This partial display occurs because a field only displays every other horizontal line of the overall picture. For example, for a particular field n, only the odd-numbered horizontal lines are scanned, and the portion of the moving object that will be displayed in field n is the portion that is scanned during the odd-numbered horizontal line sweep for field n. The next field, field n+1, is created 1/60 of a second later and will display the even-numbered horizontal lines of the picture. Thus, the portion of the moving object that is displayed in field n+1 is the portion that is scanned during the even-numbered horizontal line sweep for field n+1. Although each field is temporally distinct, the human eye perceives the sequential display of the fields as smooth motion due to the speed at which the fields are displayed.

If a viewer activates a trick mode, the trick mode video signal may contain repeated pictures, pictures that were recorded under the interlaced scanning format. For example, if the viewer initiates a freeze trick mode on a particular picture, then that picture can be repeatedly transmitted to and decoded and displayed at the DTV containing the remote decoder. The display of the repeated picture, however, is in accordance with the normal display of a non-progressive picture, i.e, the fields that make up the non-progressive picture are alternately displayed.

If a moving object appears in the pictures recorded under the interlaced scanning format, each field will display the moving object in one specific position. Thus, as these fields are alternately displayed during the freeze trick mode, the moving object in the display rapidly moves from one position in the display to another; in effect, the moving object appears to vibrate. This vibration is created because the interlaced fields are temporally distinct, and the moving object appears in a different position for each field.

This problem is also present in DTVs that include a deinterlacer. As is known in the art, a deinterlacer can construct complete frames from an interlaced field. Thus, a deinterlacer can construct complete frames out of the fields that comprise the repeated non-progressive frame. Nevertheless, these complete frames constructed from the interlaced fields will also be displayed in an alternate fashion thereby creating the possibility of the vibration artifact. In addition, this vibration effect appears in not only a freeze trick mode but may also be present in any other trick mode in which non-progressive pictures are repeated. Thus, it is desirable to eliminate the bit rate problem and the vibration artifact without increasing system costs or complexity.

SUMMARY OF THE INVENTION

The present invention concerns a method of performing a trick mode on a video signal containing a plurality of original pictures. The method includes the steps of receiving a trick mode command and selectively inserting at least one dummy bidirectional predictive picture in the video signal using field-based prediction to form a trick mode video signal. In one arrangement, each dummy bidirectional predictive picture can be a one-directional predicted picture, and the method can further include the step of predicting each dummy bidirectional predictive picture from a reference picture. Also, the predicting step can further include predicting each dummy bidirectional predictive picture from a single field associated with the reference picture.

In another arrangement, the trick mode command can be a freeze trick mode command. Alternatively, the trick mode command can be a slow motion trick mode command, and the predicting step can further include predicting a predetermined number of the dummy bidirectional predictive pictures from a first field associated with the reference picture and predicting a predetermined number of the dummy bidirectional predictive pictures from a second field associated with the reference picture to help control a vibrating pictures artifact. In addition, the method can include the step of selectively repeating at least one of the original pictures during the slow motion trick mode command to reduce choppiness in the display of the trick mode video signal.

Each dummy bidirectional predictive picture can be a picture selected from the group including frame pictures or field pictures. In addition, the reference picture can be an intra picture or a predictive picture. The method can further include the step of decoding at least a portion of the trick mode video signal with a remote decoder.

In another aspect, the method can further include the step of predicting each dummy bidirectional predictive picture from a reference picture, and the reference picture can be a non-progressive picture, a progressive picture or a field picture. Moreover, the dummy bidirectional predictive picture can be a two directional predicted picture having a first field and a second field, and the method can further include the step of predicting the first field from a first reference picture and the second field from a second reference picture. The first field can be predicted from a single field associated with the first reference picture, and the second field can be predicted from a single field associated with the second reference picture.

In one aspect of the invention, each of the plurality of original pictures can contain a display indicator, and the method can further include the step of selectively modifying the display indicator of at least a portion of the plurality of original pictures to reflect an intended display order when an original picture is repeated or when a dummy bidirectional predictive picture is inserted. Further, the display indicator can be a temporal reference field. In addition, each temporal reference field can have an integer value, and the step of selectively modifying the temporal reference field of at least a portion of the plurality of original pictures can include the step of incrementally increasing by one the integer value of the temporal reference field each time an original picture is repeated or each time a dummy bidirectional predictive picture is inserted.

The present invention also concerns a method of performing a trick mode on a video signal containing a plurality of non-progressively scanned original pictures in which each of the plurality of non-progressively scanned original pictures contains a display indicator. This method includes the steps of in response to a trick mode command, selectively repeating at least one of the non-progressively scanned original pictures to convert the video signal to a trick mode video signal and selectively modifying the display indicator of at least a portion of the plurality of the non-progressively scanned original pictures to reflect an intended display order each time an original picture is repeated. This method can further include the step of decoding at least a portion of the trick mode video signal with a remote decoder.

The present invention also concerns another method of performing a trick mode on a video signal containing a plurality of original pictures. This method includes the steps of in response to a trick mode command, selectively repeating at least one of the original pictures to convert the video signal to a trick mode video signal and selectively inserting at least one dummy bidirectional predictive picture in the trick mode video signal using field-based prediction. This method can further include the steps of monitoring the trick mode video signal and selectively inserting at least one dummy bidirectional predictive picture in the trick mode video signal if the bit rate of the trick mode video signal exceeds a predetermined threshold. Also, each of the plurality of original pictures can contain a display indicator, and the method can further include the step of selectively modifying the display indicator of at least a portion of the plurality of original pictures to reflect an intended display order when an original picture is repeated or when a dummy bidirectional predictive picture is inserted in the trick mode video signal.

The present invention also concerns a system for performing a trick mode on a video signal containing a plurality of original pictures. The system includes a controller for reading data from a storage medium and outputting the video signal containing the plurality of original pictures and a processor programmed to receive a trick mode command and selectively insert at least one dummy bidirectional predictive picture in the video signal using field-based prediction to form a trick mode video signal. The system also includes suitable software and circuitry to implement the methods as described above.

DETAILED DESCRIPTION OF THE PREFERRED EMBODIMENTS

Figure 1:
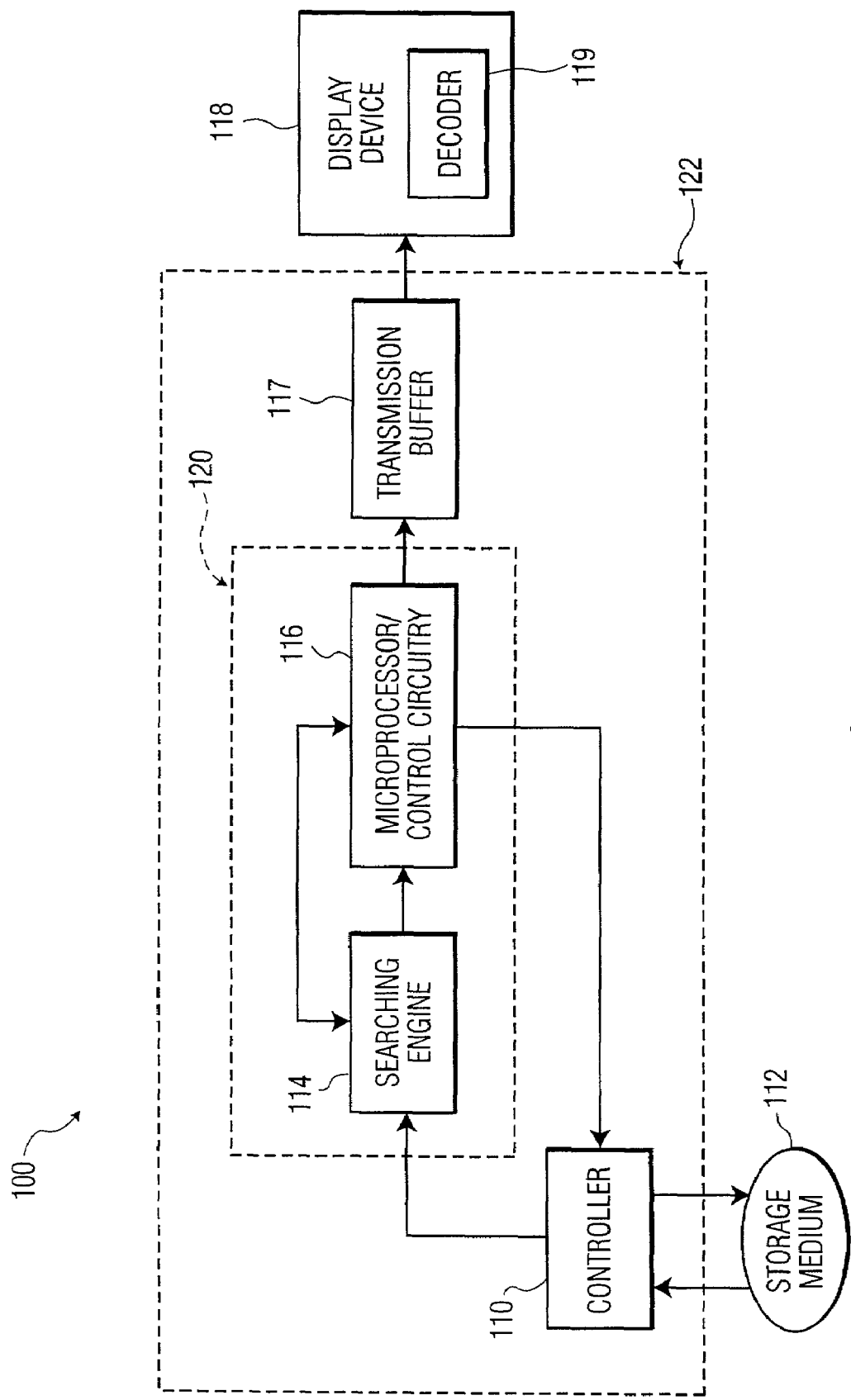
FIG. 1 is a block diagram of a system that can perform trick modes using dummy bidirectional predictive pictures in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal and transferring that signal to a display device. In addition, the system 100 is not limited to reading data from or writing data to any particular type of storage medium, as any storage medium capable of storing digitally encoded data can be used with the system 100.

The system 100 can include a controller 110 for reading data from and writing data to a storage medium 112. The system 100 can also have a searching engine 114, a microprocessor 116, a transmission buffer 117 and a display device 118. The searching engine 114 can contain suitable software and circuitry for locating one or more particular types of pictures in a video signal read from the storage medium 112. Control and data interfaces can also be provided for permitting the microprocessor 116 to control the operation of the controller 110 and the searching engine 114. Suitable software or firmware can be provided in memory for the conventional operations performed by the microprocessor 116. Further, program routines can be provided for the microprocessor 116 in accordance with the inventive arrangements.

It should be understood that all or portions of the searching engine 114 and the microprocessor 116 can be a processor 120 within contemplation of the present invention. Further, all or portions of the controller 110, the searching engine 114, the microprocessor 116 and the transmission buffer 117 can be a bitstream source 122 within contemplation of the present invention. In one arrangement, the display device 118 can contain its own decoder 119 for decoding all or a portion of any video signal read from the storage medium 112 and processed by the bitstream source 122. In this particular arrangement, the decoder (not shown) in the bitstream source 122 typically does not decode the video signal read from the storage medium 112. This particular embodiment can be referred to as a remote decoder arrangement. It should be noted, however, that the invention is not limited to this arrangement, as the invention can be practiced in other suitable systems.

In operation, the controller 110 can read a video signal containing a plurality of original pictures from the storage medium 112. These original pictures can be non-progressive pictures, progressive pictures or field pictures. In one arrangement, if the microprocessor 116 receives a trick mode command such as a slow motion or freeze command, the microprocessor 116 can signal the searching engine 114 to locate one or more suitable original pictures in the video signal. Once a suitable original picture is located, the searching engine 114 can signal the microprocessor 116, and the microprocessor 116 can generate a corresponding dummy bidirectional predictive (B) picture. A dummy B picture is a B picture whose motion vectors are set to zero and whose residual signal is set to zero or not encoded. The microprocessor 116 can then selectively insert at least one of the corresponding dummy B pictures into the video to convert this signal into a trick mode video signal. The dummy B pictures can be transmitted to the display device 118 and decoder 119 for decoding and display.

Generating dummy B pictures in this manner, i.e., when the microprocessor 116 receives a trick mode command, is referred to as generating dummy B pictures "on-the-fly." Alternatively, the microprocessor 116 can generate dummy B pictures prior to the initiation of a trick mode command in which one or more of the dummy B pictures can be stored in memory (not shown). Once the microprocessor 116 receives a trick mode command, the microprocessor 116 can retrieve one or more of the dummy B pictures from memory and insert them into the video signal. In either arrangement, the dummy B pictures can take the place of one or more of the original pictures that would normally be repeated such that the dummy B picture is transmitted to the display device 118 and displayed instead of a repeated original picture. As will be explained below, avoiding the repeating of the original non-progressive pictures in the video signal can help eliminate the vibrating pictures artifact.

Moreover, if desired, during this type of trick mode in which dummy B pictures are inserted into a video signal to form the trick mode video signal, the microprocessor 116 can repeat one or more original pictures to smooth out the display of the trick mode video signal. Such a process can be particularly helpful during a slow motion trick mode in which only dummy B pictures are initially inserted into a video signal to form the trick mode video signal.

In another arrangement, once the microprocessor 116 receives a trick mode command such as a freeze trick mode or slow motion trick mode command, the microprocessor 116 can selectively repeat at least one of the original pictures to convert the video signal to a trick mode video signal. Thus, the trick mode video signal can contain the original pictures as well as duplicates or repeats of one or more original pictures. The microprocessor 116 can also monitor the bit rate of the trick mode video signal. If the bit rate of the trick mode video signal exceeds a predetermined threshold, then the microprocessor 116, in conjunction with the searching engine 114, can perform the selectively inserting step discussed above in which at least one dummy B picture can be inserted in the trick mode video signal. This inserting step can be performed until the bit rate no longer exceeds the predetermined threshold.

In another arrangement, the microprocessor 116 can modify certain portions of information contained within one or more of the plurality of original pictures contained in the trick mode video signal to reflect an intended display order. This modification step can be performed whether original pictures are repeated or dummy B pictures are inserted in the video signal. The overall operation of the invention will be discussed in greater detail below.

Trick Modes Using Non-progressive Dummy Bidirectional Predictive Pictures

Figure 2:
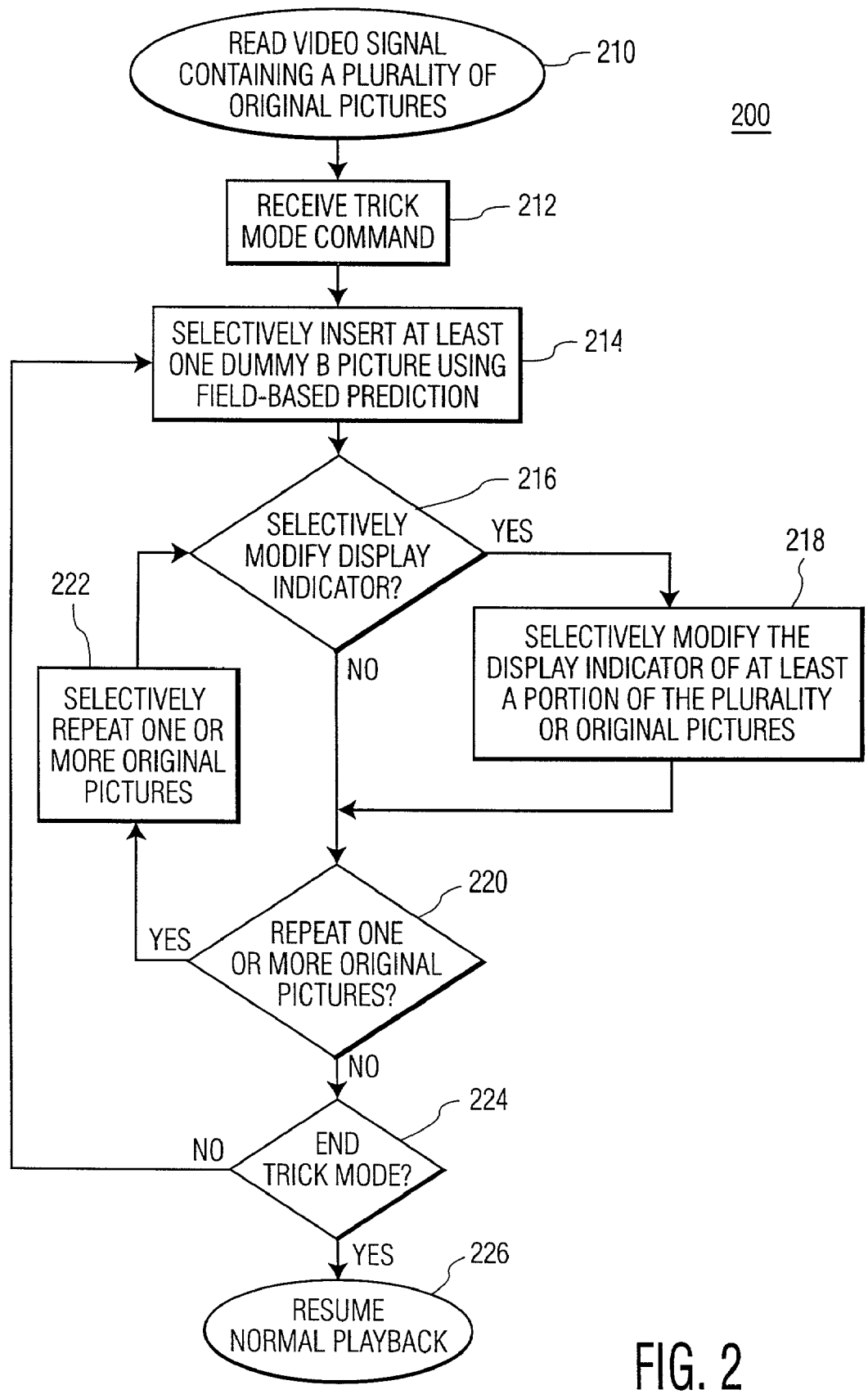
FIG. 2 is a flow chart that illustrates an operation for performing trick modes using dummy bidirectional predictive pictures in accordance with the inventive arrangements.

FIG. 2 illustrates a method 200 that demonstrates one way in which trick modes using non-progressive dummy B pictures can be performed. In one embodiment, the invention can be practiced in a remote decoder arrangement. For purposes of the invention, a remote decoder arrangement can be any system in which at least a portion of the pictures in a video signal can be decoded by a decoder that is external to and not under the control of a bitstream source that is providing the pictures to the decoder.

As an example, the bitstream source can be an optical storage medium player or recorder that reads multimedia data from an optical storage medium and transfers this data over a transmission channel to a digital television, which contains its own decoder. It is understood, however, that the invention is not limited to this example or even a remote decoder arrangement, as the invention can be practiced in any other suitable system or arrangement.

At step 210, a video signal containing a plurality of original pictures can be read. In one arrangement, these original pictures can be non-progressive pictures, progressive pictures or field pictures. At step 212, a trick mode command can be received. For purposes of the invention, the trick mode command can be any command in which one or more of the original pictures would normally be repeated including a pause or freeze trick mode command or a slow motion trick mode command. At step 214, at least one dummy B picture can be selectively inserted into the video signal using field-based prediction. That is, the dummy B picture can contain one or more fields, and each field can be predicted from another frame or field picture, including any field that makes up a frame picture. This insertion step can convert the video signal into a trick mode video signal.

As noted earlier, a dummy B picture is a B picture that can be predicted from certain pictures and whose motion vectors are set to zero and whose residual signal is set to zero or not encoded. For example, in MPEG signals, a dummy B picture's discrete cosine transform (DCT) coefficients can be set to zero or not encoded. As such, a dummy B picture contains very little information. A dummy B picture's primary purpose is to duplicate or repeat the picture from which it was predicted using very few bits. Thus, a dummy B picture is suitable for replacing certain original pictures when those original pictures are to be repeated in the trick mode video signal.

In one arrangement, the dummy B pictures can replace one or more repeated original pictures such that the dummy B pictures can be transmitted to a remote decoder rather than repeating original pictures. This insertion step can maintain a bit rate of the trick mode video signal at a manageable level, as such video signals typically tend to be elevated because numerous original pictures, particularly those with a large number of bits, would normally be repeated during the trick mode command.

For example, for a slow motion trick mode of 1/10× (1× is normal playback speed), an I picture would normally be repeated nine times. Such repetition would substantially increase the bit rate of the transmission channel, as I pictures contain a relatively large amount of encoded data. By inserting dummy B pictures in the trick mode video signal such that the dummy B pictures are sent along the transmission channel instead of the repeated I pictures, the bit rate of the video signal can be kept at a manageable level, as dummy B pictures contain far less encoded data in comparison to an I picture. It is understood, however, that the invention is not limited to this particular example, as the invention can be practiced with other suitable trick modes, some of which are presented later.

A picture from which a dummy B picture is predicted is commonly referred to as a reference picture, and a number of the original pictures can be reference pictures. The reference picture can be either an I picture or a P picture. Additionally, the reference pictures can be non-progressive pictures, progressive pictures or field pictures.

In one arrangement, the dummy B pictures that are inserted in the video signal can be one-directional prediction pictures. A one-directional prediction picture is predicted from merely one picture, whereas a B picture is generally predicted from two separate pictures. Typically, the one-directional prediction dummy B pictures can either be forward predicted dummy B pictures or backward predicted dummy B pictures. If the dummy B picture is a forward predicted dummy B picture, then the dummy B picture can be predicted from a reference picture that is before (in display order) the dummy B picture.

In contrast, if the dummy B picture is a backward predicted dummy B picture, then the dummy B picture can be predicted from a reference picture that follows (in display order) the dummy B picture. Because they are predicted merely from one picture, one-directional prediction dummy B pictures can be suitable for repeating or duplicating pictures.

Figure 4:
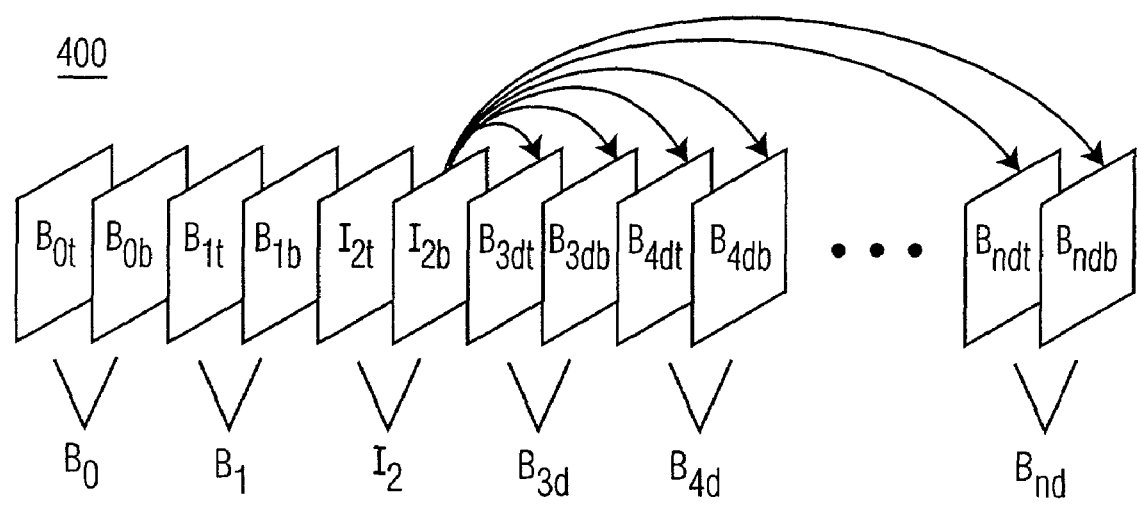
FIG. 4 illustrates a portion of a group of pictures including inserted dummy bidirectional predictive pictures.

The dummy B pictures inserted into the video signal can be predicted from the reference pictures using field-based prediction. In addition, the dummy B pictures can be frame pictures or field pictures. There are several prediction schemes that can be used to overcome the vibrating pictures problem, and several of them will be discussed now. Referring to FIG. 4, a portion of a GOP 400 containing several non-progressive pictures and dummy B frame pictures in display order is shown. The subscript numbers on the pictures in the GOP 400 reflect an intended display order of the pictures. If a freeze trick mode command is received, for example, then the freeze can be performed on a reference picture, such as $I_2$, where $I_2$ can include the fields $I_{2t}$ and $I_{2b}$.

The lowercase letter "t" can represent a top field, and the lowercase letter "b" can represent a bottom field. Also, the lowercase letter "d" signifies that the B picture is a dummy B picture. Instead of continuously repeating picture $I_2$, dummy B pictures can be inserted into the video signal in accordance with step 214 (which creates a trick mode video signal) for the duration of the freeze command.

If the dummy B pictures are frame pictures, then the fields that make up the dummy B frame pictures can be predicted from a single field of the reference picture, in this case, picture $I_2$. Thus, as shown in FIG. 4, the fields of the first dummy B frame picture $B_{3d}$—in this case, field $B_{3dt}$ representing the top field and field $B_{3db}$ representing the bottom field—can be predicted from a single field of the picture $I_2$, such as the bottom field $I_{2b}$. In addition, the fields of each subsequent dummy B frame picture ($B_{4d}$ through $B_{Nd}$ where N represents the final dummy B picture of the freeze trick mode) can be predicted from the reference field $I_{2b}$.

It must be noted, however, that the invention is not limited to the above example, as the freeze trick mode can be performed on any other suitable reference picture, and the fields of the corresponding dummy B frame pictures can be predicted from any other suitable field. Moreover, the dummy B frame pictures are not limited to prediction from a single field associated with a reference picture, as the fields of a dummy B picture can be predicted from any suitable combination of the fields of a reference picture. Although the example illustrates the use of forward predicted dummy B frame pictures, backward predicted dummy B frame pictures can be used as well.

In addition to keeping the bit rate of the trick mode video signal to an acceptable level, using this particular prediction scheme during the freeze trick mode can help control the vibrating pictures artifact. Specifically, predicting the fields of the dummy B frame pictures from a single field of the reference picture on which the freeze trick mode is performed can produce a display in which a moving object appears in one specific position for each of the fields of the dummy B frame pictures to be displayed. That is, if a moving object appears in the reference picture from which the dummy B frame pictures are predicted and the fields of the dummy B frame pictures are predicted from a single field of this reference picture, then each field of the dummy B frame pictures will include the moving object in the same position as it is located in the single reference field. Accordingly, as the dummy B frame pictures are displayed during the freeze trick mode, the moving object does not appear to vibrate.

In addition to inserting dummy B frame pictures, dummy B field pictures can be inserted into the video signal in accordance with the above discussion to create a trick mode video signal. Thus, where applicable, the term "dummy B pictures" can mean dummy B frame pictures or dummy B field pictures. The dummy B field pictures, by their very nature, can be predicted from a single field of a reference picture.

It is also understood that the invention is not limited to one directional predicted frame pictures. For instance, one or more of the dummy B pictures can be two directional predicted pictures. As an example, a first field of a dummy B picture can be predicted from a field associated with a first reference picture, and a second field of the dummy B picture can be predicted from a field associated with a second reference picture. This prediction scheme can be in accordance with the above discussion such that one of the fields of the dummy B picture can be either a backward or a forward predicted picture and the other field of the dummy B picture can have a prediction direction opposite that of the first field.

For example, referring once again to GOP 400, the first field of a dummy B picture can be a forward predicted picture predicted from field $I_{2b}$ of reference picture $I_2$, and the second field of the dummy B picture can be a backward predicted picture predicted from a separate field (such as the top field) associated with a second reference picture (not shown). Predicting the dummy B pictures in such a manner provides the same advantages that using one directional predicted pictures provides, namely, lowering the bit rate and controlling the vibrating pictures problem. It is understood, however, that the invention is not limited to the foregoing example, as other prediction schemes that employ two directional predicted pictures can be used.

It is also understood that the invention is not limited to predicting dummy B pictures from non-progressive reference pictures. As such, dummy B pictures can be predicted from progressively scanned pictures or even field pictures in accordance with the above discussion. Specifically, the two fields of a dummy B frame picture can be predicted from a single progressive reference picture or a single reference field picture. Likewise, two directional prediction schemes such as those described above can be employed using two separate progressive reference pictures or two separate reference field pictures.

Figure 5:
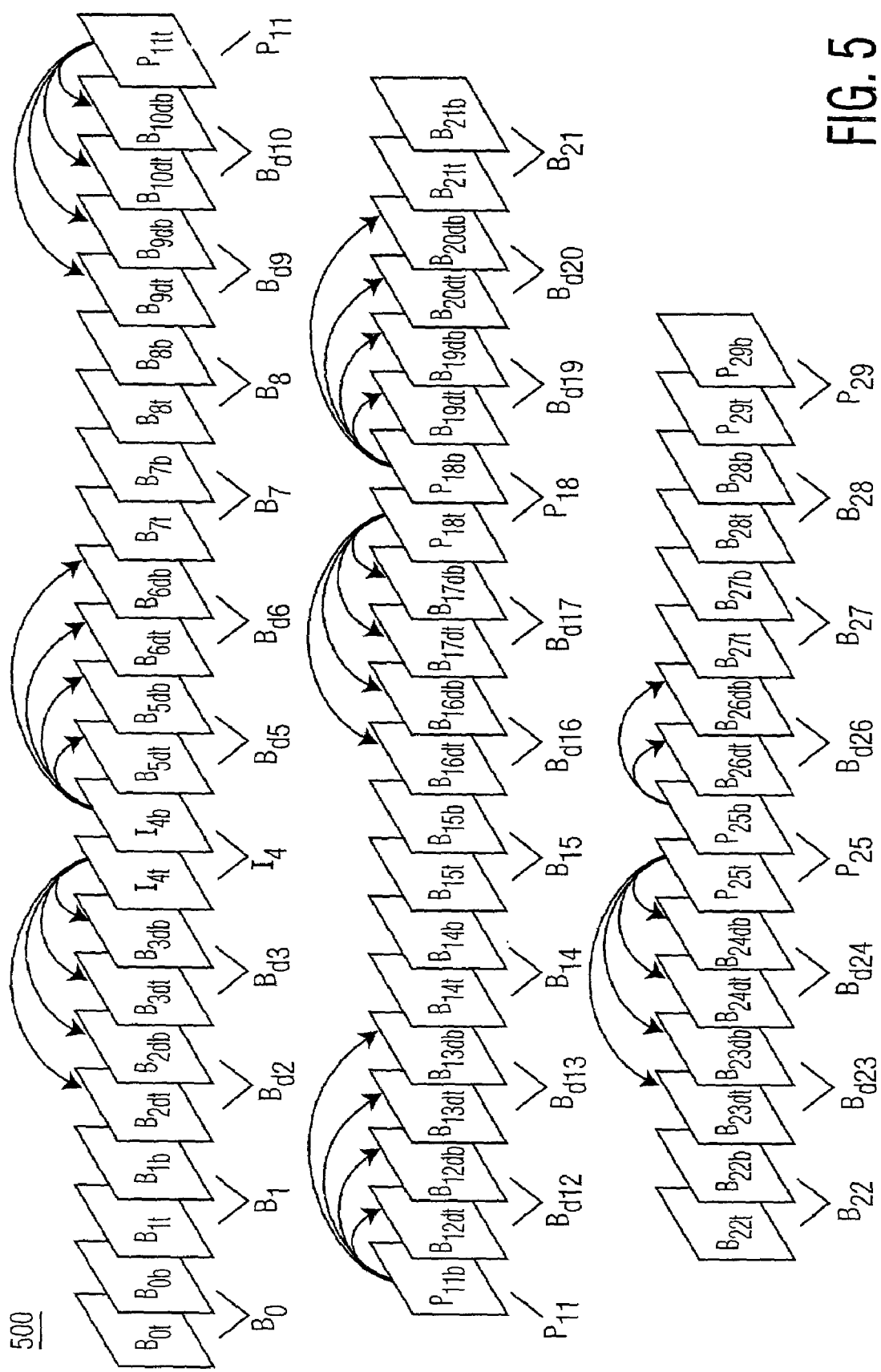
FIG. 5 illustrates an example of a slow motion group of pictures in accordance with the inventive arrangements.

The vibrating pictures problem is not limited to freeze trick modes. Such an artifact may be present during slow motion playback as well. Referring to FIG. 5, a slow motion trick mode GOP 500 in accordance with the inventive arrangements is shown. As shown, a predetermined number of dummy B frame pictures can be inserted before and/or after one or more of the reference pictures in the GOP 500 based on the desired playback speed. Inserting these dummy B frame pictures into the GOP 500 can decrease the playback speed of the GOP 500.

FIG. 5 illustrates a GOP 500 that can produce a slow motion playback speed of ½× and can limit the vibrating pictures artifact. Like FIG. 4, the lowercase letter "t" indicates a top field, the lowercase letter "b" indicates a bottom field, the lowercase letter "d" indicates whether a B picture is a dummy B picture and the subscript numbers reflect an intended display order. In this example, the fields of backward predicted dummy B frame pictures $B_{d2}$ and $B_{d3}$ ($B_{2dt}$, $B_{2db}$, $B_{3dt}$ and $B_{3db}$, respectively) can be predicted from the top field, $I_{4t}$, of the non-progressive picture $I_4$. Also, the fields of forward predicted dummy B frame pictures $B_{d5}$ and $B_{d6}$ ($B_{d5t}$, $B_{d5b}$, $B_{d6t}$ and $B_{d6b}$, respectively) can be predicted from the bottom field, $I_{4b}$, of the non-progressive picture $I_4$. As shown in GOP 500, similar field-based prediction can be performed with respect to the other reference pictures P11, P18 and P25.

As noted in the discussion relating to the freeze trick mode of FIG. 4, if a moving object appears in the field of a reference picture, then the fields of the dummy B frame pictures that are predicted from that reference picture field will display the moving object in the same location. In this example, if a moving object is present in field $I_{4t}$, then the moving object can appear in the same place in the following fields: $B_{2dt}$, $B_{2db}$, $B_{3dt}$ and $B_{3db}$. Likewise, if a moving object is present in field $I_{4b}$, then fields $B_{5dt}$, $B_{5db}$, $B_{6dt}$ and $B_{6db}$ will include the moving object in the same location. This concept can apply to one or more of the other reference pictures in the GOP 500, as shown in FIG. 5.

In one arrangement, the number of fields of dummy B frame pictures predicted from the top field and the bottom field of the reference picture can be equal. This process is illustrated with respect to reference non-progressive pictures $I_4$, $P_{11}$ and $P_{18}$. Inserting a predetermined number of dummy B frame pictures in this manner can produce a better trick mode display because the movement of a moving object in the reference picture (assuming such an object is in the reference picture) is limited. For example, referring to the dummy B frame pictures predicted from reference picture $I_4$, out of a total of ten fields, a moving object would appear to jump or vibrate only once during the display of these fields.

It must be noted, however, that the invention is not limited to this particular GOP 500, as other suitable GOPs and other suitable prediction schemes can be used to limit the vibrating pictures artifact for not only a ½× trick mode speed but for other slow motion playback speeds as well. Furthermore, dummy B field pictures can be inserted into a video signal in accordance with the above discussion to produce a slow motion trick mode while limiting the vibrating pictures artifact. Two directional predicted dummy B frame pictures can be used during a slow motion trick mode as well.

Referring back to FIG. 2, in another embodiment, each of the plurality of original pictures can contain a display indicator. As determined at decision block 216, if the display indicators of these pictures are to be selectively modified, then the display indicator of at least a portion of the plurality of original pictures can be selectively modified following the insertion of dummy B pictures, as shown at step 218.

Notably, modifying these display indicators can reflect an intended display order of the plurality of original pictures when a dummy B picture is inserted in the video signal. It is understood, however, that this process can be performed irrespective of whether dummy B pictures are inserted during the trick mode. Thus, the step of modifying a display indicator can be performed during a conventional trick mode in which pictures are merely repeated and no dummy B pictures are inserted into the video signal. Referring back to the method 200, if the display indicators are not to be modified, then the method 200 can continue at step 220.

In one arrangement, the display indicator can be a temporal reference field. A temporal reference field is typically a ten bit field located in the picture header of digitally encoded pictures. Some decoders rely on the temporal reference field to determine when a particular picture in a video signal will be displayed relative to other pictures in the video signal. This field normally has an integer value. For example, some groups of pictures (GOP) contain fifteen pictures. The temporal reference field of the first picture in the GOP, i.e., the picture immediately following the GOP header, can have an integer value of zero. The temporal reference field of the next frame picture to be displayed can have an integer value of one. Thus, the integer value of the temporal reference field for each subsequent picture to be displayed can be increased by one.

When a dummy B picture is inserted in the trick mode video signal, however, the display order according to the temporal reference fields of the original pictures is no longer valid. Accordingly, the integer value of the temporal reference fields of the original pictures that follow the inserted dummy B pictures can be modified to indicate a proper display order. For example, if the first picture in a GOP is sent to the display device and three corresponding dummy B pictures are sent as well (this is in accordance with a slow motion playback), then the integer value of the temporal reference field of the original reference picture (assuming that it is the first picture in the GOP to be displayed) can be kept as zero, the temporal reference field of the first dummy B picture can be set to an integer value of one, the temporal reference field of the second dummy B picture can be set to an integer value of two and the temporal reference field of the third dummy B picture can be set to an integer value of three. In addition, the temporal reference field of the next original picture to be displayed can be modified from its original integer value of one to an integer value of four.

This step of incrementally increasing the integer values of the temporal reference fields can continue until the trick mode is rescinded and the temporal reference field of the last picture in the last GOP affected by the trick mode is modified. Once the next GOP is reached, the integer value of the temporal reference field of the first display picture in the new GOP can be zero. Thus, each time a dummy B picture is inserted into the trick mode video signal, the integer value of the temporal reference fields of each original picture following the inserted dummy B pictures can be incrementally increased by one through the trick mode GOPs to reflect the intended display order.

The integer value for the temporal reference field can have a maximum value of 1,023. If the integer values for the temporal reference fields of the pictures that make up a GOP (the original pictures plus the dummy B pictures) reach this value, then the temporal reference field can merely wrap around and begin again at zero. As an example, if a very slow motion trick mode is initiated, the integer value of one of the dummy B pictures or one of the original pictures may eventually reach 1,023. Once that occurs, the integer value for the temporal reference field of the next immediate dummy B or original picture to be displayed can be set to zero. Of course, it should be noted that the invention is not limited to the use of a temporal reference field, as any other suitable display indicator can be modified to reflect an intended display order in either of the embodiments discussed above. Also, the wrap around value is by no means limited to 1,023, as other suitable values can be used.

Referring back to method 200 of FIG. 2, at decision block 220, it can be determined whether one or more original pictures will be repeated during the trick mode. If yes, then such a process can be performed at step 222. If not, then the method 200 can continue to step 224. Repeating one or more original pictures during the trick mode can help improve the choppiness of the trick mode display.

For example, if a slow motion trick mode command is received and dummy B pictures predicted from the reference pictures are inserted, then the trick mode display may become fairly uneven, as the reference pictures will be displayed for possibly significant amounts of time while the remaining original pictures, i.e., the non-reference pictures, will be displayed in accordance with a normal playback speed. Such choppiness in the display may worsen as the trick mode playback speed decreases. As an example, referring back to FIG. 5, if desired, some of the B pictures in the GOP 500 could be repeated to cut down on the jerkiness of the trick mode display, particularly if the number of dummy B pictures predicted from the reference pictures increases due to a decrease in the desired playback speed.

If an original picture is repeated in accordance with steps 220 and 222, then the method 200 can continue at step 216, where it can be determined whether the display indicators of the following original pictures are to be modified. Thus, the display indicators of original pictures can be modified in accordance with the above discussion relating to steps 220 and 222 if an original picture is repeated. Continuing with the method 200, at decision block 224, if the trick mode is to end, then normal playback can resume at step 226. If the trick mode is to continue, the method 200 can pick up at step 214. Of course, method 200 is merely an example, and the trick mode can be rescinded at any other suitable step in method 200.

Figure 3:
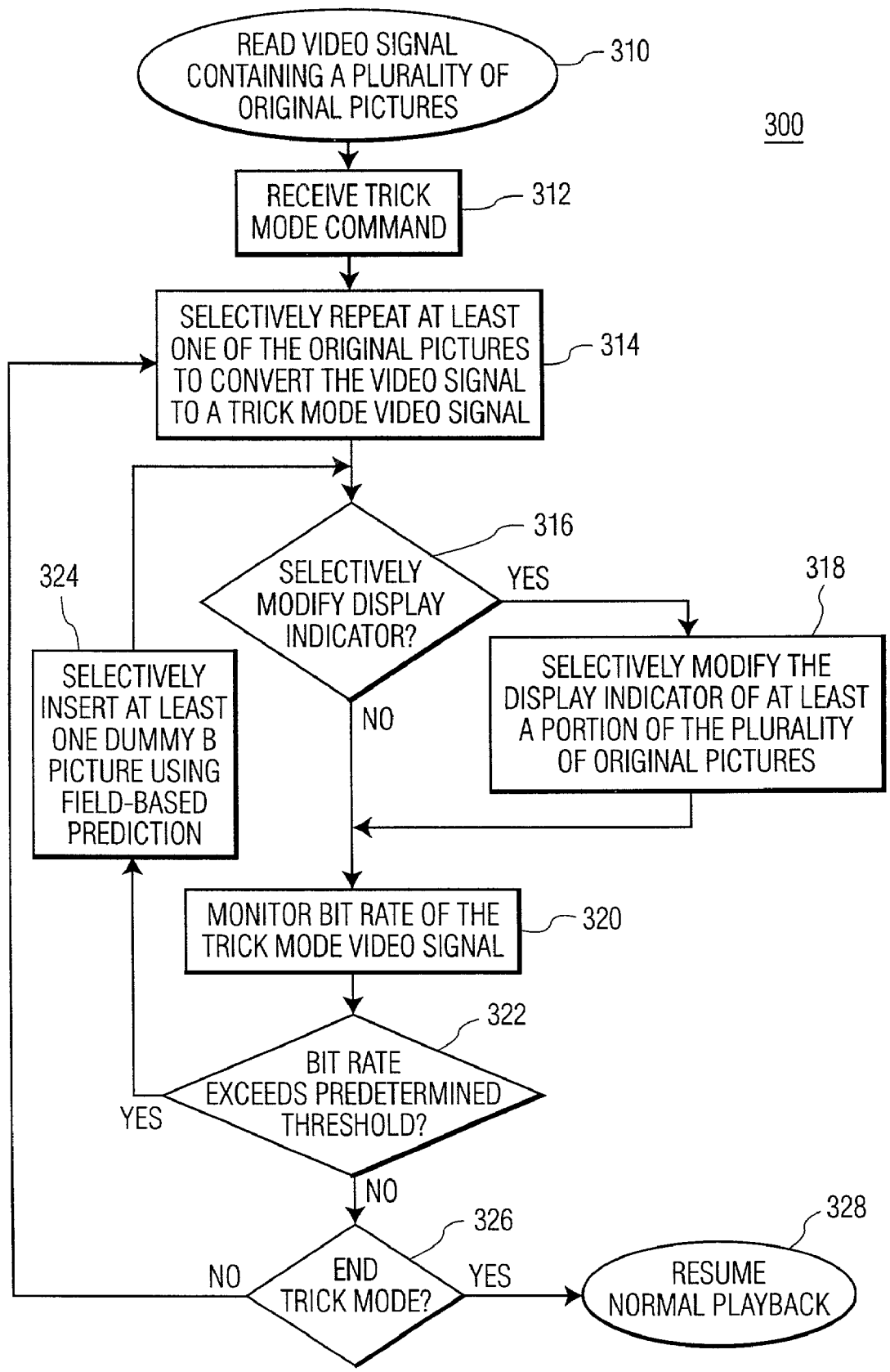
FIG. 3 is a flow chart that illustrates another operation for performing trick modes using dummy bidirectional predictive pictures in accordance with the inventive arrangements.

Referring to FIG. 3, a method 300 illustrates another way of using non-progressive dummy B pictures during a trick mode. At step 310, a video signal containing a plurality of original pictures can be read. Similar to method 200, these original pictures can be non-progressive pictures, progressive pictures or field pictures. At step 312, a trick mode command such as a freeze trick mode command or a slow motion trick mode command can be received. At step 314, at least one of the original pictures can be selectively repeated to convert the video signal to a trick mode video signal. At steps 316 and 318, if desired, the display indicators of at least a portion of the original pictures can be modified in accordance with the discussion relating to steps 216 and 218 of method 200.

During the trick mode command, the bit rate of the trick mode video signal can be monitored, as shown at step 320. Monitoring the bit rate may be necessary during a trick mode because several original pictures in the video signal may be repeated one or more times thereby resulting in an increased bit rate. In certain cases, this increased bit rate may exceed the maximum allowable bit rate for the transmission channel that is carrying the trick mode video signal. For purposes of the invention, this maximum allowable bit rate for the transmission channel can be referred to as a predetermined threshold.

At decision block 322, it can be determined whether the bit rate of the trick mode video signal has exceeded this predetermined threshold. If the bit rate has not reached the predetermined threshold and the trick mode is to continue at decision block 326, then the method 300 can continue at decision block 314. Referring back to decision block 322, if the bit rate has exceeded the predetermined threshold, then dummy B pictures can be inserted in the trick mode video signal using field-based prediction, as shown at step 324.

This insertion step can be in accordance with the discussion relating to step 214 of method 200. As no picture can be predicted from a B picture, however, it is unnecessary to replace the duplicates or repeats of an original picture if the original picture is a B picture. That is, if the original picture is a B picture, the repeated B pictures do not have to be replaced by dummy B pictures. Nevertheless, repeating B pictures should not cause the bit rate of the trick mode video signal to exceed the maximum limit of the transmission channel, as B pictures typically contain relatively small amounts of encoded data. Thus, the trick mode video signal can contain repeated original pictures and dummy B pictures.

Following step 324, the method 300 can continue at decision block 316, where the display indicators of the original pictures that follow the dummy B picture can be modified if so desired. If the trick mode is to stop as determined at decision block 326, then normal playback can resume, as shown at step 328. It is understood, however, that the trick mode can be rescinded at any other suitable step in the method 300.

Although the present invention has been described in conjunction with the embodiments disclosed herein, it should be understood that the foregoing description is intended to illustrate and not limit the scope of the invention as defined by the claims.

What is claimed is:

1. A method of performing a trick mode on a video signal containing a plurality of original pictures, comprising the steps of:
   predicting dummy bidirectional predictive pictures from a single field associated with a respective reference picture;
   receiving one of a slow motion or freeze trick mode command; and
   selectively inserting at least one of said predicted dummy bidirectional predictive pictures picture in the video signal using field-based prediction to form a trick mode video signal;
   wherein a predetermined number of the dummy bidirectional predictive pictures are predicted from a first field associated with a respective reference picture and a predetermined number of the dummy bidirectional predictive pictures are predicted from a second field associated with a respective reference picture to help control a vibrating pictures artifact.

2. The method according to claim 1, further comprising the step of selectively repeating at least one of the original pictures during the slow motion trick mode command to reduce choppiness in the display of the trick mode video signal.

3. The method according to claim 1, wherein each dummy bidirectional predictive picture is a picture selected from the group comprising frame pictures or field pictures.

4. The method according to claim 1, wherein the reference picture is an intra picture.

5. The method according to claim 1, wherein the reference picture is a predictive picture.

6. The method according to claim 1, further comprising the step of decoding at least a portion of the trick mode video signal with a remote decoder.

7. The method according to claim 1, further comprising the step of predicting each dummy bidirectional predictive picture from a reference picture and the reference picture is a picture selected from the group comprising a non-progressive picture, a progressive picture or a field picture.

8. The method according to claim 1, wherein the dummy bidirectional predictive picture is a two directional predicted picture having a first field and a second field and the method further comprises the step of predicting the first field from a first reference picture and the second field from a second reference picture.

9. The method according to claim 8, wherein said step of predicting the first field and the second field of the dummy bidirectional predictive picture further comprises the step of predicting the first field from a single field associated with the first reference picture and predicting the second field from a single field associated with the second reference picture.

10. The method according to claim 2, wherein each of the plurality of original pictures contains a display indicator and the method further comprises the step of selectively modifying the display indicator of at least a portion of the plurality of original pictures to reflect an intended display order when an original picture is repeated or when a dummy bidirectional predictive picture is inserted.

11. The method according to claim 10, wherein the display indicator is a temporal reference field.

12. The method according to claim 11, wherein each temporal reference field has an integer value and the step of selectively modifying the temporal reference field of at least a portion of the plurality of original pictures comprises the step of incrementally increasing by one the integer value of the temporal reference field each time an original picture is repeated or each time a dummy bidirectional predictive picture is inserted.

13. A method of performing a trick mode on a video signal containing a plurality of original pictures, comprising the steps of:
   monitoring the trick mode video signal;
   in response to a trick mode command, selectively repeating at least one of the original pictures to convert the video signal to a trick mode video signal; and
   selectively inserting at least one dummy bidirectional predictive picture in the trick mode video signal using field-based prediction if the bit rate of the trick mode video signal exceeds a predetermined threshold.

14. The method according to claim 13, wherein each of the plurality of original pictures contains a display indicator and the method further comprises the step of selectively modifying the display indicator of at least a portion of the plurality of original pictures to reflect an intended display order when an original picture is repeated or when a dummy bidirectional predictive picture is inserted in the trick mode video signal.

15. A system for performing a trick mode on a video signal containing a plurality of original pictures, comprising:
   a controller for reading data from a storage medium and outputting the video signal containing the plurality of original pictures; and
   a processor programmed to:
      predict dummy bidirectional predictive pictures from a single field associated with a respective reference picture;
      receive one of a slow motion or freeze trick mode command; and
      selectively inserting at least one dummy bidirectional predictive picture in the video signal using field-based prediction to form a trick mode video signal;
   wherein a predetermined number of the dummy bidirectional predictive pictures are predicted from a first field associated with a respective reference picture and a predetermined number of the dummy bidirectional predictive pictures are predicted from a second field associated with a respective reference picture to help control a vibrating pictures artifact.

16. The system according to claim 15, wherein the processor is further programmed to selectively repeat at least one of the original pictures during the slow motion trick mode command to reduce choppiness in the display of the trick mode video signal.

17. The system according to claim 15, wherein each dummy bidirectional predictive picture is a picture selected from the group comprising frame pictures or field pictures.

18. The system according to claim 15, wherein the reference picture is an intra picture.

19. The system according to claim 15, wherein the reference picture is a predictive picture.

20. The system according to claim 15, further comprising a remote decoder for decoding at least a portion of the trick mode video signal.

21. The system according to claim 15, wherein the processor is further programmed to predict each dummy bidirectional predictive picture from a reference picture and the reference picture is a picture selected from the group comprising a non-progressive picture, a progressive picture or a field picture.

22. The system according to claim 15, wherein the dummy bidirectional predictive picture is a two directional predicted picture having a first field and a second field and the processor is further programmed to predict the first field from a first reference picture and the second field from a second reference picture.

23. The system according to claim 22, wherein the processor is further programmed to predict the first field from a single field associated with the first reference picture and predict the second field from a single field associated with the second reference picture.

24. The system according to claim 16, wherein each of the plurality of original pictures contains a display indicator and the processor is further programmed to selectively modify the display indicator of at least a portion of the plurality of original pictures to reflect an intended display order when an original picture is repeated or when a dummy bidirectional predictive picture is inserted.

25. The system according to claim 24, wherein the display indicator is a temporal reference field.

26. The system according to claim 25, wherein each temporal reference field an integer value and the processor is further programmed to selectively modify the temporal reference field of at least a portion of the plurality of original pictures by incrementally increasing by one the integer value of the temporal reference field each time an original picture is repeated or each time a dummy bidirectional predictive picture is inserted.

27. A system for performing a trick mode on a video signal containing a plurality of original pictures, comprising:
    a controller for reading data from a storage medium and outputting the video signal containing the plurality of original pictures; and
    a processor programmed to:
        monitor the trick mode video signal;
        in response to a trick mode command, selectively repeat at least one of the original pictures to convert the video signal to a trick mode video signal; and
        selectively insert at least one dummy bidirectional predictive picture in the trick mode video signal using field-based prediction if the bit rate of the trick mode video signal exceeds a predetermined threshold.

28. The system according to claim 27, wherein each of the plurality of original pictures contains a display indicator and the processor is further programmed to selectively modify the display indicator of at least a portion of the plurality of original pictures to reflect an intended display order when an original picture is repeated or when a dummy bidirectional predictive picture is inserted in the trick mode video signal.

* * * * *